United States Patent [19]

Prewo et al.

[11] 4,435,455
[45] Mar. 6, 1984

[54] COMPLIANT COMPOSITE TUBULAR LINERS OF FIBER REINFORCED GLASS/GLASS-CERAMIC HAVING UTILITY AS GUN BARREL LINERS

[75] Inventors: Karl M. Prewo, Vernon; John J. Brennan, Portland, both of Conn.

[73] Assignee: United Technologies Corporation, Hartford, Conn.

[21] Appl. No.: 456,884

[22] Filed: Jan. 10, 1983

[51] Int. Cl.³ .................... B32B 1/08; B32B 17/12; F41C 21/02; F41F 17/08

[52] U.S. Cl. .................................. 428/36; 42/76 A; 89/16; 428/367; 428/400; 428/426; 428/450; 428/469; 428/697; 428/698; 428/701; 428/902

[58] Field of Search ............ 89/16; 42/76 A; 428/36, 428/367, 400, 426, 450, 469, 697, 698, 701, 902

[56] References Cited

U.S. PATENT DOCUMENTS

| | | | |
|---|---|---|---|
| 2,915,946 | 12/1959 | Marden | 89/16 |
| 2,977,666 | 4/1961 | Brace et al. | 42/76 A |
| 3,025,765 | 3/1962 | Baker | 89/16 |
| 3,517,585 | 6/1970 | Slade | 89/16 |
| 3,742,640 | 7/1973 | Thomsen | 42/76 A |
| 4,260,657 | 4/1981 | Loyd et al. | 428/367 |
| 4,263,367 | 4/1981 | Prewo | 428/367 |
| 4,265,968 | 5/1981 | Prewo | 428/367 |
| 4,324,843 | 4/1982 | Brennan et al. | 428/367 |
| 4,341,840 | 7/1982 | Prewo | 428/367 |
| 4,370,390 | 1/1983 | Burk | 428/367 |

FOREIGN PATENT DOCUMENTS 952133  7/1974  Canada .................. 428/367

*Primary Examiner*—James C. Cannon
*Attorney, Agent, or Firm*—Alan C. Cohen

[57] ABSTRACT

A compliant tubular liner particularly adapted to withstand brisant forces is disclosed. These liners comprising graphite or silicon carbide fiber reinforced glass or glass-ceramic have a high fracture toughness, a relatively low elastic modulus and a high temperature resistance. These articles are particularly useful as gun barrel liners.

5 Claims, 2 Drawing Figures

COMPLIANT COMPOSITE TUBULAR LINERS OF FIBER REINFORCED GLASS/GLASS-CERAMIC HAVING UTILITY AS GUN BARREL LINERS

DESCRIPTION

TECHNICAL FIELD

The field of art to which this invention pertains is fiber reinforced matrix composite structures and particularly compliant tubular liners capable of withstanding brisant forces.

BACKGROUND ART

When a ballistic round is fired, an explosion takes place just behind the projectile, creating hot gases which expand and force the projectile out of the barrel. In order to insure the greatest power from this explosion, (efficiency), it is necessary to prevent these gases from passing between the internal diameter of the barrel (bore) and the outer diameter of the projectile. This is accomplished by making the tolerances between the bore and projectile very close. However, these close tolerances mean that some physical contact between the projectile and the wall is inevitable as the projectile makes its way through the barrel. This contact creates local stresses in the barrel, which in turn create cracks and fissures along the bore. This physical contact also erodes some of the material thereby enlarging the bore diameter. In addition, the explosion of the powder creates a brisance or shattering effect which places sharp and sudden stresses on the gun barrel. These stresses can create additional fractures, cracks and fissures in low fracture toughness materials which further destroy the close tolerances required for maximum performance. The hot gases which are created during this explosion also add to the deterioration of the bore dimensions. These gases are both erosive and corrosive and have a strong oxidizing effect on the metal alloys presently being used for gun barrel application. These materials do not possess the optimum in corrosion and erosion resistance necessary for a long life. The current state of the art gun barrels are fabricated from stellite lined, chrome-plated steel tubes. Due to the high percentage of the critical elements cobalt and chromium, barrels of this type are becoming increasingly expensive to manufacture.

In light of these limitations a liner made of ceramic materials has been sought for this application because in general, they can provide a greater resistance to erosion and corrosion forms of deterioration. However, ceramics have a low fracture toughness which makes them susceptible to chipping, flaking and cracking from the stresses created during firing and place a serious limitation on their use. Similarly, these ceramics typically have elastic modulii greater than that of the surrounding steel main gun barrel. A typical elastic modulus for steel is $30 \times 10^6$ psi (206 GPa) while that for high performance ceramics such as silicon carbide, silicon nitride and alumina is approximately $50 \times 10^6$ psi (345 GPa) or greater. This relatively higher stiffness of the ceramic liner limits the ability of the surrounding steel to provide structural reinforcement and causes high stresses to occur in the ceramic liner during gun barrel firing. A tough, compliant non-metallic tubular liner capable of overcoming the disadvantages present in the prior art could find utility in many areas.

DISCLOSURE OF INVENTION

The disclosure is directed to compliant composite liners for tubular structures comprising either graphite or silicon carbide fiber reinforced glass or glass-ceramic. These liners, when used in combination with high strength outer sleeves are capable of withstanding the sudden sharp stresses associated with brisant effects. These liners are characterized by a relatively low modulus of elasticity and high fracture toughness and a maintenance of this performance at elevated temperatures.

Another aspect of the invention includes a gun barrel comprising a composite liner of the above material surrounded by a conventional metal barrel.

The foregoing and other features and advantages of the present invention will become more apparent in light of the following description and accompanying drawings.

BEST MODE FOR CARRYING OUT THE INVENTION

Figure 1:
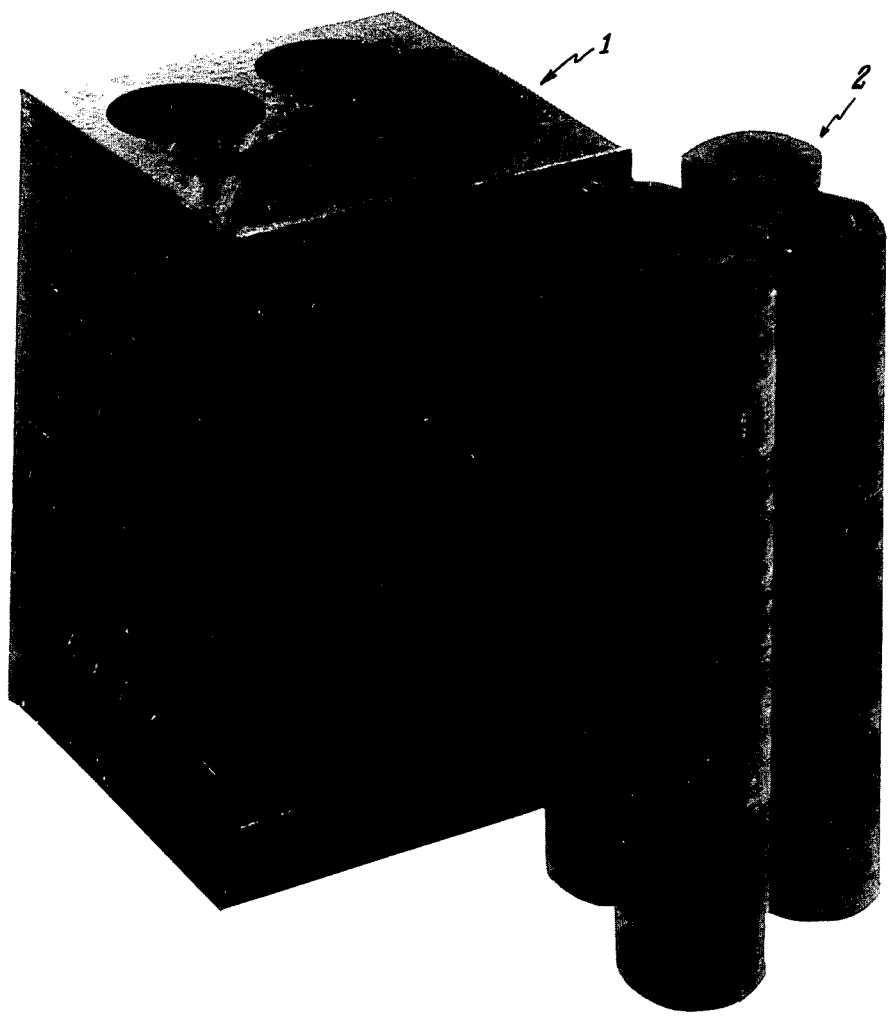
FIG. 1 shows a diamond core drilled liner made according to the present invention.

Two fiber materials which may be employed in the present invention are graphite and silicon carbide.

The fiber should have a high elastic modulus, high strength and a preferred length of 1 cm to about 3 cm. A preferred graphite fiber is Celion (Celanese Corporation) having a modulus of elasticity of about $34 \times 10^6$ psi (234 GPa) and an average strength of about $400 \times 10^3$ psi (2760 MPa). The preferred silicon carbide fiber is available from Nippon Carbon Corporation of Japan and has a modulus of elasticity of about $28 \times 10^6$ psi (193 GPa) and then average strength of about 300 ksi (2000 MPa).

In a fiber reinforced glass composite, many glass matrices may be used as long as the coefficients of thermal expansion of the glass and the fibers are compatible. This will help to ensure structural integrity. A glass which is particularly suitable is a borosilicate glass designated Corning 7740 (available from Corning Glass Works). This particular glass has an anneal point of 560° C., a softening point of 821° C., a liquidus temperature of 1017° C., a density of 2.23 gm/cm$^3$, an index of refraction of 1.474, a dielectric constant of 4.6, a coefficient of linear expansion of 32.5 cm/cm °C. $\times 10^{-7}$ and a modulus of elasticity of $9.1 \times 10^6$ psi (63 GPa).

When silicon carbide fibers are employed an added strict limitation is the amount and activity of the titanium present in the glass or glass-ceramic. Accordingly, if titanium nucleating agents are present, they must be inactivated or kept below 1% by weight. While conventional lithium aluminosilicate is the preferred glass-ceramic, other conventional glass-ceramics such as aluminosilicate, magnesium aluminosilicate and combinations of the above can be used as long as the matrix material is titanium free. It is preferable that at least 90% of the glass-ceramic used with either the graphite or silicon carbide fibers be capable of passing through a −325 mesh sieve.

In general the fibers of the present invention are discontinuous and laid in a controlled manner, for example substantially equal numbers of fibers in-plane in every direction. The fiber orientation can be favored in a particular in-plane direction when it is known that a particular article will undergo stress primarily in one direction. These fibers are generally arranged in paper-like sheets wherein the fibers are temporarily bound together by an organic binder. These sheets are then combined with glass powder and laid up in a desired form with the fibers in the desired direction. The composites of the present invention are preferably formed by cutting the fiber paper to the desired shape followed by removal of the binder, for example, by solvent immersion or passing the paper through a Bunsen burner flame to burn off the binder. The fiber paper is next passed through a glass powder containing slurry or stacking them with layers of glass dispersed between them. The glass must be of sufficient quantity to fill the spaces between the fibers. The formed articles are then hot pressed and densified at elevated temperatures (1000°–1400° C.) and under pressure (around 6.9 MPa) to form the composite. The optimum fiber contents for these structures is about 15% to about 30% by volume.

These compliant tubular liners may be formed using different combinations of materials and techniques. Which technique and what materials are employed are a function of, among other things, the properties of the final product and the shape desired. Although these compliant tubular structures are well suited as gun barrel liners, which are traditionally cylindrical in shape, there is no reason to believe that any other cross-sectional form would not work just as satisfactorily.

EXAMPLE

Celion graphite fiber paper (International Paper Company) containing about 5 to about 10% by weight of a polyester binder was cut into individual pieces about $7\frac{1}{2}$ cm$^2$. The plies were then dipped into a slurry of Corning 7740 borosilicate glass in propanol. A preferred slurry composition comprised 40 gm of powdered glass in 780 ml of propanol. Preferably the glass is ground so that at least 90% of it passes through a $-325$ mesh sieve. The plies are then dried, by either exposure to air or a radiant heat source, i.e. a heat blower, to remove the propanol. After drying, about 60 pieces of the glass impregnated plies were laid up in a graphite mold for consolidation at elevated temperatures. For this particular structure the plies were laid such that all the fibers were in the radial and tangential direction only, with no fibers in the direction along the axis of the cylinder. The mold with the plies was baked out at 400° C. to remove the binder on the graphite paper; and then hot pressed at 1200° C. for 15 minutes in a $10^{-5}$ torr vacuum under about 6.9 MPa pressure. Approximately a 0.500 inch thick plate was produced by this method. A total of 8 plates were prepared using the above method. The plates were then stacked in graphite dies and re-pressed again, under the same conditions as before, to form the final $3''\times 3''\times 4''$ ($7\frac{1}{2}$ cm $\times 7\frac{1}{2}$ cm $\times 10.2$ cm) thick block of graphite fiber/glass composite material. There were no discontinuities introduced at the bond line between the plates when this method was used.

Figure 2:
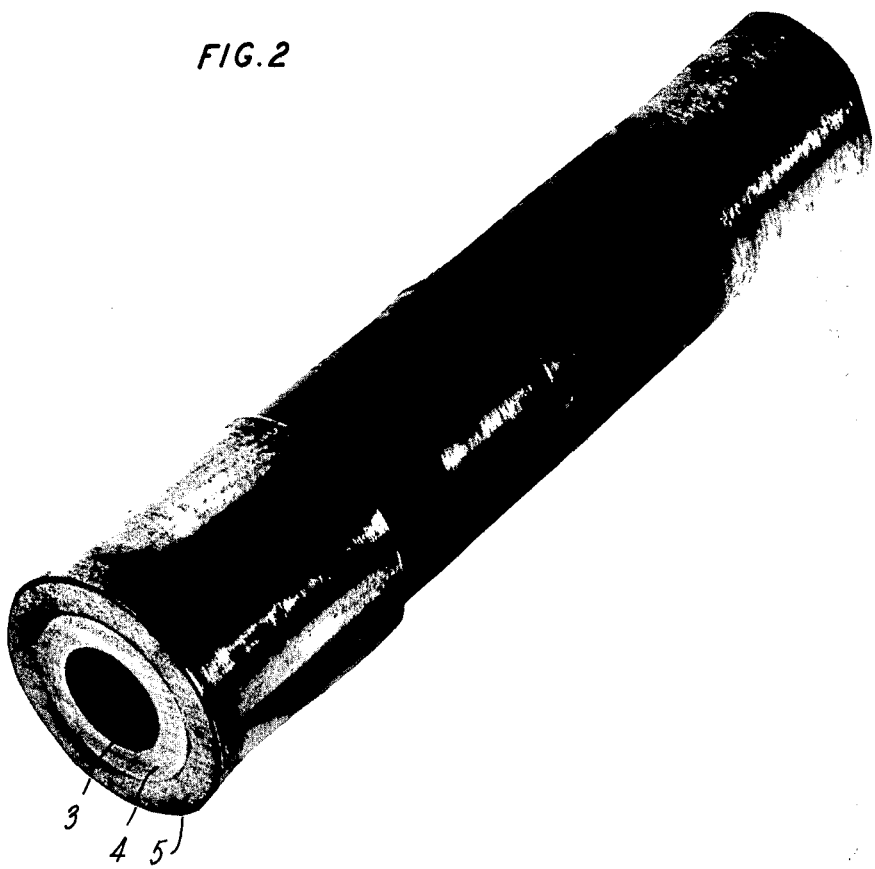
FIG. 2 shows an assembled gun barrel comprising such a liner within a steel outer jacket.

Four cylinders, four inches long with nominal ID's of 0.475 inch and nominal OD's of 0.925 inch (indicated as character 2 in FIG. 1) were diamond core drilled from this block (indicated as character 1 in FIG. 1). These cylinders were then machined to the proper dimensions for insertion into the metal sleeves (4) which are then inserted into the gun barrel jackets (5) shown in FIG. 2. The machined cylinders are shown as character 3 in FIG. 2. These barrels were then subjected to ten shots single fire. Inspection showed that the graphite/glass composite liners were capable of withstanding the pressure stresses resulting from firing without failure. Even when pre-existing cracks were present, no tendency for crack growth or catastrophic failure was exhibited. The Table presents the physical properties of the discontinuous graphite fiber reinforced glass gun barrel liner described above.

TABLE

| | discontinuous graphite/glass |
|---|---|
| Modulus of Elasticity | $8 \times 10^6$ psi (55.8 GPa) |
| Critical Stress Intensity Factor | $10 \times 10^3$ psi (inch)$^{\frac{1}{2}}$ |
| Tensile Strength | $19.4 \times 10^3$ lbs/in$^2$ |
| Flexural Strength | $45.5 \times 10^3$ lbs/in$^2$ |
| Failure Strain | .79% |

The present compliant non-metallic tubular liners are superior over the current state of the art in several ways. The tubular liners of the present invention have a relatively low elastic modulus which gives them greater compliancy. When placed within a steel outer barrel, this compliancy allows them to withstand deforming stresses without cracking. The elastic modulus for a discontinuous graphite fiber/glass liner is less than about $12\times 10^6$ psi (83 GPa) while a discontinuous silicon carbide fiber/glass-ceramic structure would be less than about $15\times 10^6$ psi (103 GPa). These tubular liners also have a high fracture toughness, exemplified by their high critical stress intensity factors making them capable of withstanding the sudden sharp and repeated shocks associated with brisant forces without fracturing even in the presence of cracks and flaws. This fracture toughness is exemplified in the graphite/glass composite as a critical stress intensity factor greater than $8\times 10^3$ psi (inch)$^{\frac{1}{2}}$ and in the silicon carbide/glass-ceramic as a critical stress intensity factor greater than $5\times 10^3$ psi (inch)$^{\frac{1}{2}}$. These compliant tubes also retain their properties at elevated temperatures associated with gun barrel firing.

Compliant fiber reinforced composite tubular structures such as described will find application not only as gun barrel liners or as part of an all composite gun barrel but where any tubular structure is required to withstand brisant forces in erosive or corrosive environments. Exhaust structures for rockets or for missiles are two alternative possible applications.

Although the invention has been shown and described with respect to a preferred embodiment, it will be understood by those skilled in this art that various changes in form and detail thereof may be made without departing from the spirit and scope of the claimed invention.

We claim:

1. A compliant tubular liner particularly adapted to withstand brisant forces comprising a fiber reinforced glass or glass-ceramic matrix having an elastic modulus less than $15\times 10^6$ psi and high fracture toughness exemplified by a critical stress intensity factor greater than $5\times 10^3$ psi (inch)$^{\frac{1}{2}}$.

2. A composite gun barrel comprising a fiber reinforced glass or glass/ceramic matrix liner surrounded by a metal outer sleeve, the liner having an elastic modulus less than $15\times 10^6$ psi, a fracture toughness exemplified by a critical stress intensity factor greater than $5\times 10^3$ psi (inch)$^{\frac{1}{2}}$, and being capable of withstanding brisant forces.

3. An article of claims 1 or 2 wherein the fibers are silicon carbide or graphite.

4. An article of claims 1 or 2 wherein the fibers range in length from 0.25–0.75 inch.

5. An article of claims 1 or 2 wherein the matrix is comprised of a glass-ceramic selected from the group consisting of lithium aluminosilicate, magnesium aluminosilicate, or a combination thereof.

* * * * *